May 23, 1961 R. W. JENSEN 2,985,374
PNEUMATIC CONTROL MEANS
Filed June 7, 1956

RAYMOND W. JENSEN,
INVENTOR.

BY John H. J. Wallace

United States Patent Office 2,985,374
Patented May 23, 1961

2,985,374

PNEUMATIC CONTROL MEANS

Raymond W. Jensen, Phoenix, Ariz., assignor to The Garrett Corporation, Los Angeles, Calif., a corporation of California Filed June 7, 1956, Ser. No. 589,957

10 Claims. (Cl. 236—82)

This invention relates to pneumatic control means, and more particularly to means for use in controlling fluid pressure operated devices, such as valves, actuators, and other elements which respond to variations in fluid pressure.

Heretofore, the use of pneumatic pressure as a combined control and motive power medium has been generally known. However, difficulty has been encountered in the operation of pressure regulators which receive a high pressure fluid and deliver a regulated control pressure for use in operating various pneumatic actuators which require accurate variations in pneumatic pressure over a wide range to accomplish their intended functions.

Conventional temperatures responsive pneumatic controls lack fine accuracy due to their limited ranges of control output pressure variations relative to corresponding operating amplitudes of the thermostatic elements of said controls.

A pressure regulator, which is controlled entirely by a spring force, is usually incapable of delivering pressure which may be varied over a wide range. When such a spring operated regulator, having a fixed output pressure, is used in combination with a thermostat or other controlling device acting as a variable vent for pressure downstream of an orifice forming the regulator outlet, the range of pressure adjustment which may be accomplished by the thermostat is unduly limited.

Previous pneumatic controls employing pressure regulators which are entirely spring operated, tend to be unstable and hunt, thereby causing operational instability of pneumatic actuators which receive control pressures from such regulators.

Accordingly, it is an object of the present invention to provide a pneumatic control means employing a control pressure regulator having a pressure output orifice disposed to deliver control pressure which may be variable over a wide range, due to the fact that pressure upstream of the orifice is varied in accordance with control pressure changes downstream of the orifice to maintain a constant pressure differential thereacross.

Another object of the invention is to provide a temperature responsive pneumatic control means employing thermostatic elements having nominal amplitudes of operation relative to a wide range of pressure variations which the control is capable of causing.

Another object of the invention is to provide a temperature responsive pneumatic control means wherein the temperature responsive structure is very compact in proportion to the wide range of pneumatic pressure changes which may be accomplished by the control means.

Another object of the invention is to provide a novel means which is adapted for use as a pneumatic control device, and which responds to variations in temperature, pressure or mechanical movement.

Another object of the present invention is to provide a pneumatic control means which is capable of delivering a very stable control pressure output over a wide range of pressure variations, even though pressure of fluid, entering the regulator of the control means, may vary.

A further object of the invention is to provide a pneumatic control means which is very simple to construct, compact, and reliable in operation.

Further objects and advantages of the invention may be apparent from the following specification, appended claims and accompanying drawing, in which:

Figure 1:
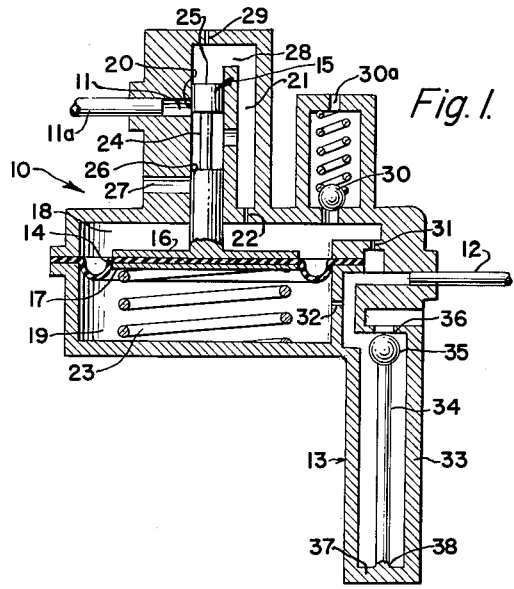
Figure 1 is a diagrammatic sectional view of a temperature responsive pneumatic control means according to the present invention.
Figure 3:
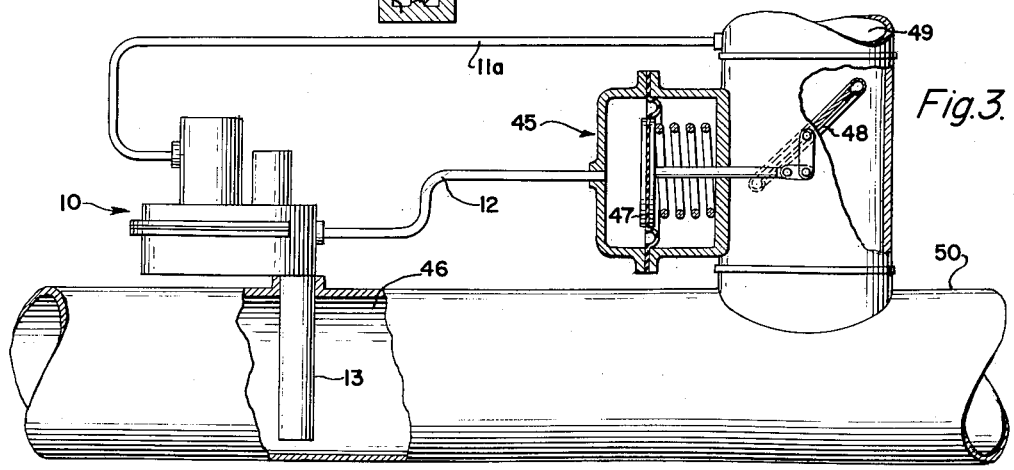
Figure 3 is a diagrammatic view showing the control means illustrated in Figure 1 in connection with a valve disposed to control fluid flow through a conduit.

As shown in Figure 1 of the drawing, a pressure regulator 10 is provided with an inlet 11, which is arranged to receive fluid under high pressure. For example, in some installations high pressure air from an aircraft main engine compressor may be conducted through the inlet tube 11a to the inlet 11 of the pressure regulator. An output conduit 12 is disposed to deliver regulated pressure to a fluid pressure operated device, such as a pneumatic actuator for a valve, as shown in Figure 3 of the drawing.

A thermostat 13 acts to vary regulated pressure in the conduit 12 in accordance with thermal changes. As shown in Figure 3, the thermostat 13 may be disposed to sense temperature changes in a conduit downstream of a pneumatically actuated valve being controlled by pressure in the conduit 12.

Referring specifically to Figure 1 of the drawing, it will be seen that the pressure regulator 10 is provided with a diaphragm 14 serving as a pressure responsive, movable wall, which actuates a regulating valve 15 connected therewith. The diaphragm 14 has opposed surfaces 16 and 17, which are both pressure responsive. The surface 16 of the diaphragm 14 communicates with a pressure receiving chamber 18, while the surface 17 communicates with a second pressure receiving chamber 19. Fluid under pressure from the inlet 11 communicates with the chamber 18 via a valve port 20, the valve 15, a second valve port 21, and a restricted passage 22.

The valve 15 is disposed between the ports 20 and 21 and serves to modulate flow through the inlet port 20, in accordance with the pressure differential acting on the diaphragm 14. A spring 23 acting on the diaphragm 14, tends to force it toward the chamber 18. The valve 15 is a conventional plunger type valve, having an annular groove 24, the opposite ends 25 and 26 of which are functionally related to the port 20 and a port 27 which communicates with ambient atmosphere. The spacing of ends 25 and 26 of the annular groove 24 corresponds with the spacing of the ports 20 and 27, whereby movement of valve 15 toward the chamber 19 causes substantially concurrent closing of the port 20 and opening of the port 27.

The port 27 serves as a pressure relieving port which is opened when supply pressure entering the inlet 11 is very high and pressure on the surface 16 causes the valve 15 to move to an almost fully closed position with respect to the port 20. Thus, when pressure reaches an unduly high value in the chamber 18, pressure is relieved through the port 27. Communicating with the port 21 is a passage 28, which intercommunicates with the restricted passage 22 and another restricted passage 29, communicating with ambient pressure. The passage 29 permits a slight continuous flow through the valve 15 of the pressure regulator, in order to maintain stable operation thereof, as will be hereinafter described in detail.

Communicating with the chamber 18 is a relief valve 30, which is spring-loaded and adapted to vent pressure from the chamber 18, to ambient atmosphere via a vent 30a, when the pressure in chamber 18 exceeds a predetermined maximum value. When the relief valve 30 is opened by a predetermined pressure, the restricted passage 22 limits flow to the chamber 18, permitting the vent valve 30 to accomplish a reduction of pressure in the chamber 18, so that pneumatic devices communicating with the output conduit 12 of the control means will not be subjected to unduly high pressures which might damage them.

Communicating with the chamber 18 is an orifice 31 which serves as a restricted outlet for the pressure regulator. The conduit 12, and the chamber 19 which communicates therewith via a restricted passage 32, contains fluid pressure downstream of the orifice 31. It will be understood that the force of the spring 23 substantially corresponds to the force differential between pressures in the chambers 18 and 19 which act on the diaphragm 14. The differential between these pressures is related to a normal pressure differential across the orifice 31, said pressure differential being established by flow through a thermostatic valve seat 36, which intercommunicates with the pressure output conduit 12 and ambient pressure, or a region of pressure lower than that in the conduit 12, as will be hereinafter described in detail.

The thermostat 13 is provided with an outer cylindrical body 33, having a rod 34 therein, which carries a valve element 35 operable adjacent to the valve seat 36. The cylindrical element 33 is provided with an enclosed end 37 to which one end 38 of the rod 34 is fixed. The cylindrical body 33 has a greater coefficient of expansion than that of the rod 34 and responds very rapidly to temperature changes while, at the same time, acting as an insulator for the rod 34. When a temperature increase is sensed by the cylindrical member 33, it expands to a much greater extent than does the rod 34, which causes the cylindrical member 33 at its end 37 to pull the rod 34 downwardly and move the valve element 35 away from the seat 36. The opposite effect takes place when a decrease in temperature is sensed by the cylindrical member 33.

Figure 2:
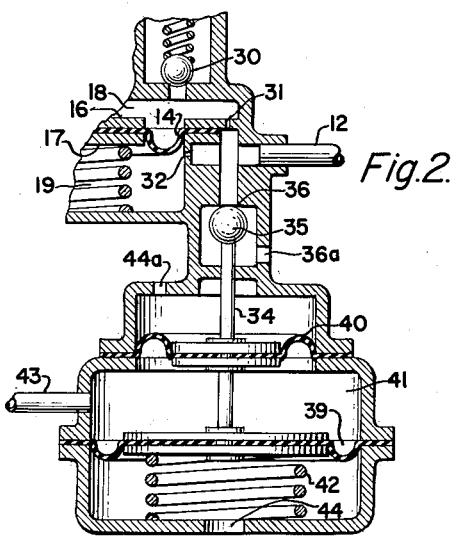
Figure 2 is a fragmentary view similar to that of Figure 1, but showing a modification of the present invention which utilizes a pressure responsive control element in place of a thermostatic control element.

Referring to a modification of the invention as shown in Figure 2 of the drawing, it will be seen that the stem 34 of the valve element 35 interconnects pressure responsive diaphragms 39 and 40, which communicate with a fluid pressure receiving chamber 41. A spring 42 engages the diaphragm 39 and exerts a force thereon, tending to oppose the force of fluid pressure in the chamber 41. The chamber 41 may be connected by means of a tube 43 to any desired source of control pressure. It will be noted that the diaphragm 40 has less area exposed to pressure in the chamber 41 than does the diaphragm 39, whereby a predetermined pressure in the chamber 41 acts to compress the spring 42 and to move the valve element 35 away from the seat 36. The surfaces of diaphragms 39 and 40 opposite those facing chamber 41 are exposed to ambient pressure through openings 44 and 44a respectively.

The valve seat 36 intercommunicates with ambient pressure through an opening 36a.

It will be understood that the valve element 35 may be moved relative to the seat 36 by thermostatic means, fluid pressure responsive means, or any other means serving as a control device. Thus, the term "variable valve means" as used herein, is intended to cover a range of equivalents, including various means for operating the valve elements 35 and 36.

*Operation*

As shown in Figure 3 of the drawing, for example, the thermostat 13 of the temperature responsive pneumatic control of the present invention is disposed in a fluid conduit 46 and the output conduit 12 is connected to a valve actuator 45. The valve actuator 45 is a conventional pneumatically responsive device having a spring-loaded diaphragm 47 connected to a butterfly valve element 48, which controls flow of hot air through a conduit 49. The conduit 49 communicates with a cold air conduit 50 and the conduit 46 downstream thereof. The diaphragm 47 senses fluid pressure in the output conduit 12 and the control regulator inlet tube 11a communicates with the conduit 49 upstream of the valve 48. High pressure fluid from the conduit 49 is regulated and reduced to a value in accordance with temperature sensed by the thermostat 13. The thermostat 13 thus controls pressure in the conduit 12 in accordance with temperature in the conduit 46. When temperature in the conduit 46 exceeds a predetermined value, the thermostat decreases pressure in the conduit 12, permitting the spring-loaded diaphragm 47 to move the valve 48 toward a closed position, to reduce the amount of hot air delivered to the conduit 46. If temperature in the conduit 46 drops below a predetermined value, the thermostat increases pressure in the conduit 12 and forces the spring-loaded diaphragm to move the valve 48 toward an open position, which increases the amount of hot air delivered to the conduit 46.

It will be understood that the invention may be used to control devices other than those shown in Figure 3 of the drawing; therefore, the following description of operation is directed primarily to functions of the invention as shown in Figure 1.

As heretofore described, fluid under high pressure is admitted through the inlet 11; the output conduit 12 is connected to an actuator or valve to be controlled; and the thermostat 13 is dipsosed in a region to sense temperature changes, and thereby effect variations of pressure within the output conduit 12.

Variations in fluid pressure entering the valve 15 through the inlet 11 are readily compensated for by action of the diaphragm 14. When pressure increases at the inlet 11, this pressure is sensed by the surface 16 of the diaphragm 14, tending to cause the valve 15 at its portion 25 to reduce the flow area of the port 20, thereby compensating for an increase of pressure entering the regulator 10 through the inlet 11.

In order to assure stable operation of the valve 15 and diaphragm 14, orifice 29 is provided to bleed off fluid which may leak around the valve element 15, so that such leakage does not effect an unwarranted change of pressure in the passage 28 and chamber 18 when the valve 15 is operating near a closed position with respect to the port 20.

When the regulator 10 establishes pressure in the chamber 18, the orifice 31 and restricted passage 32 conduct pressure to the chamber 19, opposing that in the chamber 18. Since there is a normal pressure differential across the orifice 31, the spring 23 is positioned in the chamber 19 in order to produce a force equal to the force differential between the pressures acting on the opposed surfaces 16 and 17 of the diaphragm 14.

The force of the spring 23 is substantially constant throughout the actuating range of the valve 15. The force of the spring, therefore, substantially corresponds to the pressure differential across the orifice 31 throughout the operating pressure range of the regulator 10.

It will be understood that the area of the valve 15 at its modulating surface 25 is great, relative to that of the orifice 31, whereby modulating amplitude of the valve 15 is very slight, and consequently, deflection of the spring 23 is correspondingly slight. Further, it will be understood that since both sides of the diaphragm are subjected to forces of fluid pressure, the spring 23 does not serve entirely as a pressure regulating spring but merely operates to establish a pressure differential across the diaphragm 14. Accordingly, the rate of the spring is nominal, and since its maximum deflection is also very slight, the rate of the spring may be considered substantially constant with respect to the operation of the present device.

The variable valve means, including the elements 35 and 36, communicates with the output conduit 12, the orifice 31 and the restricted passage 32. When a reduced temperature is sensed by the cylindrical element 33, it contracts and reduces the flow area between the valve elements 35 and the seat 36, whereupon pressure is increased in the output conduit 12, restricted passage 32 and the chamber 19 downstream of the orifice 31. An increase of pressure in the chamber 19 causes a slight pressure differential change across the diaphragm 14, which tends to open the valve 15 with respect to the port 20, permitting a corresponding increase of pressure in the chamber 18. A substantially constant pressure differential is thus maintained across the orifice 31, while pressures in the output conduit 12 and chambers 18 and 19 are increased.

When the cylindrical element 33 senses an increase in temperature, the valve element 35 is moved away from the seat 36, creating an increased flow capacity therethrough, and consequently lowering pressure in the conduit 12 downstream of the orifice 31. Likewise, pressure in the chamber 19 is reduced, whereupon a pressure differential change exists across the diaphragm 14, which tends to move it toward the chamber 19, thereby forcing the valve 15 to restrict flow through the port 20. A substantially constant pressure differential, across the orifice 31, is thus maintained.

Figure 4:
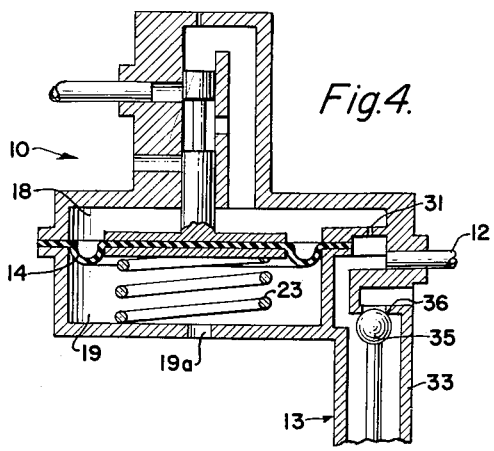
Figure 4 is a view similar to Figure 1, showing a prior art device.

In the prior art device shown in Fig. 4 of the drawing, the diaphragm 14 of the pressure regulator 10 senses atmospheric pressure in the chamber 19 via an opening 19a. The spring 23 tends to oppose pressure in the chamber 18 in order to maintain a constant pressure upstream from the orifice 31 which serves as the pressure regulator outlet. It will be noted that the flow through the orifice 31 is, at all times, in the subsonic range.

While the vent valve member 35 of the prior art device varies pressure in the conduit 12, pressure upstream of the orifice 31 is maintained constant. Thus, the prior art device permits pressure differential variations across the orifice 31, while maintaining a constant pressure upstream thereof.

In the prior art device the valve element 35, when moving to restrict flow through the seat 36, causes an increase of pressure in the conduit 12. When pressure downstream of the orifice 31 of the prior art device increases, the pressure differential across the orifice 31 decreases due to maintenance of constant pressure upstream of the orifice 31. When the pressure differential across the orifice 31 decreases, flow therethrough decreases.

Since flow through the orifice 31 decreases concurrently with a closing movement of the valve element 35 to restrict the valve seat 36 and increase pressure in the conduit 12, the required operating amplitude of the valve element 35 is proportionately increased. When the valve element 35 of the prior art device moves to increase flow through the seat 36, to reduce pressure in the conduit 12, the opposite effects take place.

From the foregoing, it is apparent that the required operating amplitudes and thermally responsive lengths of the valve elements 33 and 35 are increased in both opening and closing directions in accordance with adverse changes of flow through the orifice 31 of the prior art device.

In accordance with the present invention, as shown in Figure 1 of the drawing, flow through the orifice 31 is at all times in the subsonic region in order to prevent choking of the orifice 31, which serves as the pressure regulator outlet. This subsonic flow through the orifice 31 exists due to the maintenance of a substantially constant pressure differential which is nominal, and therefore, does not tend to create a supersonic flow through the orifice 31.

While the pressure differential across the orifice 31 of the present invention is maintained substantially constant, and when pressures upstream and downstream thereof increase, flow through the orifice 31 is increased slightly. It will be understood that an increase in pressures in chambers 18 and 19 increases density of the air therein, whereby weight flow, through the orifice 31, increases. Thus, when the valve element 35 moves to restrict area of the seat 36, and causes increases of pressures in the chambers 18 and 19, flow through the orifice 31 increases and thereby assists the vent valve 35 to increase pressure in the conduit 12.

When the valve element 35 moves to increase area of the seat 36 and to cause a decrease of pressure in the chambers 18 and 19 and the output conduit 12, the opposite effects take place. It will, therefore, be apparent from the foregoing that the required operating amplitudes and thermally responsive lengths of the valve elements 33 and 35 are minimized in both the opening and closing directions in accordance with co-operative changes of flow through the orifice 31.

It will be understood that the thermally responsive operating amplitudes of the thermostatic elements 33 and 35 may be only a few thousandths of an inch, while their overall lengths may be several inches.

From the foregoing it will be obvious that the length of the thermostatic elements 33 and 35 of the present invention may be made considerably shorter than those of the prior art device, in proportion to a desired range of pressure variations within the conduit 12, which may communicate with various pneumatically operable devices. The thermostat structure of the present invention, therefore, may be compact and readily installed in confined places, such as small diameter ducts or conduits.

The relief valve 30 serves as a safety device and opens when pressure in the chamber 18 exceeds a predetermined maximum amount, thus limiting the ability of the thermostatic valve elements 35 and 36 to increase pressure in the output conduit 12 above a safe level which can be tolerated by the structures of valves and actuators communicating with the output conduit 12.

Under normal operating conditions, the area of the orifice 32 is not critical; however, should the diaphragm 14 develop a leak and permit the spring 23 to force the valve 15 to a fully open position with respect to the port 20, restriction of the orifice 32 is necessary to maintain emergency operation of the present control device.

In the event the diaphragm develops a leak, from the chamber 18 to the chamber 19, the flow resulting from said leak, to the conduit 12 is limited by restriction of the orifice 32. Thus, pressure in the conduit 12 is then established according to the combined flow capacities of the orifices 31 and 32 as related to relief flow through the thermostatic valve seat 36. When the conduit 12 receives combined flow from the orifices 31 and 32, pressure in the conduit 12 is increased accordingly. The valve as shown in Figure 3, for example, is then caused to be moved toward an open position, which admits more hot air to the conduit 46. Temperature then increases in the conduit 46 and the thermostatic element 33 acts to open the valve element 35 relative to the seat 36, until an increased temperature and vent flow setting of the thermostatic valve element 35 is established to match the combined flow areas of the orifices 31 and 32. Thus, failure of the diaphragm 14 causes the thermostatic valve elements 35 and 36 to permit a slightly increased temperature to exist in the conduit 46.

Various modifications of the present invention may be resorted to in a manner limited only by a just interpretation of the following claims.

I claim:
1. In a pneumatic control means the combination of: a pressure regulator having an inlet and a restricted outlet, said pressure regulator having a pressure responsive movable wall; valve means operable by said movable wall and disposed to control flow through said inlet; a variable vent valve communicating with fluid pressure downstream from said restricted outlet, said vent valve communicating with a region of pressure lower than that existing downstream of said outlet, said movable wall having opposed first and second pressure responsive surfaces, said first surface communicating with said valve means upstream from said restricted outlet, said second surface communicating with fluid pressure downstream from said restricted outlet; a control pressure receiving passage means communicating with said restricted outlet upstream of said variable vent valve and downstream of said restricted outlet, and means applying additional force to said second surface of said movable wall.

2. In a pneumatic control means the combination of: a pressure regulator having an inlet and a restricted outlet, said pressure regulator having a pressure responsive movable wall; valve means operable by said movable wall and disposed to control flow through said inlet; a variable vent valve communicating with fluid pressure downstream from said restricted outlet, said vent valve communicating with a region of pressure lower than that existing downstream of said outlet, said movable wall having opposed first and second pressure responsive surfaces, said first surface communicating with said valve means upstream from said restricted outlet, said second surface communicating with fluid pressure downstream from said restricted outlet; a control pressure receiving passage means communicating with said restricted outlet upstream of said variable vent valve and downstream of said restricted outlet; means applying an additional force to said second surface of said movable wall; a first restricted passage means intercommunicating with said inlet and said first surface; and a second restricted passage means intercommunicating with said valve means and a region of pressure lower than that existing between said inlet and said first restricted passage.

3. In a pneumatic control means the combination of: a pressure regulator having an inlet and a restricted outlet, said pressure regulator having a pressure responsive movable wall; valve means operable by said movable wall and disposed to control flow through said inlet; a variable vent valve communicating with fluid pressure downstream from said restricted outlet, said vent valve communicating with a region of pressure lower than that existing downstream of said outlet, said movable wall having opposed first and second pressure responsive surfaces, said first surface communicating with said valve means upstream from said restricted outlet, said second surface communicating with fluid pressure downstream from said restricted outlet; a control pressure receiving passage means communicating with said restricted outlet upstream of said variable vent valve and downstream of said restricted outlet; means applying additional force to said second surface of said movable wall; and a relief valve communicating with said first surface and arranged to vent a predetermined excessive pressure therefrom.

4. In a thermostatic control means the combination of: a pressure regulator having an inlet and a restricted outlet, said pressure regulator having a pressure responsive movable wall; throttling valve means operable by said movable wall and disposed to control flow through said inlet; a thermally operable vent valve communicating with fluid pressure downstream from said restricted outlet, said vent valve communicating with a region of pressure lower than that existing downstream of said outlet, said movable wall having opposed first and second pressure responsive surfaces, said first surface communicating with said valve means upstream from said restricted outlet, said second surface communicating with fluid pressure downstream from said restricted outlet; a control pressure receiving passage means communicating with said restricted outlet upstream of said variable vent valve and downstream of said restricted outlet; and spring means exerting an additional force on said second surface of said movable wall.

5. In a thermostatic control means the combination of: a pressure regulator having an inlet and a restricted outlet, said pressure regulator having a pressure responsive diaphragm; throttling valve means operable by said diaphragm and disposed to control flow through said inlet; a thermally operable vent valve communicating with fluid pressure downstream from said restricted outlet, said vent valve communicating with a region of pressure lower than that existing downstream of said outlet, said diaphragm having opposed first and second pressure responsive surfaces, said first surface communicating with said valve means upstream from said restricted outlet, said second surface communicating with fluid pressure downstream from said restricted outlet; a control pressure receiving passage means communicating with said restricted outlet upstream of said variable vent valve and downstream of said restricted outlet; and spring means tending to move said diaphragm in a direction to actuate said throttling valve toward an open position.

6. In a pneumatic control means the combination of: a pressure regulator having an inlet and a restricted outlet, said pressure regulator having a pressure responsive movable wall; valve means operable by said movable wall and disposed to control flow through said inlet; a variable vent valve communicating with fluid pressure downstream from said restricted outlet, said vent valve communicating with a region of pressure lower than that existing downstream of said outlet, said movable wall having opposed first and second pressure responsive surfaces, said first surface communicating with said valve means upstream from said restricted outlet, said second surface communicating with fluid pressure downstream from said restricted outlet; a control pressure receiving passage means communicating with said restricted outlet upstream of said variable vent valve and downstream of said restricted outlet; a restricted passage means providing communication between said restricted outlet and said second surface; and means applying an additional force to said second surface of said movable member.

7. In a pneumatic control means, the combination of: body means forming a fluid chamber with inlet and outlet passages; movable wall means dividing said chamber into inlet and control pressure sections, one of said means forming an orifice to establish limited communication between said inlet and control pressure sections; valve means disposed in said body means for movement by said wall means to control fluid flow through said inlet passage to said fluid chamber; resilient means disposed in said body means and tending to move said wall means in a direction to open said valve means; means forming a vent port establishing communication between the control pressure section of said chamber and the ambient atmosphere; a thermostatically-actuated valve for controlling fluid flow through said vent port to vary the pressure in said control pressure section; and a fluid pressure responsive actuator separate from said vent valve and communicating with said control pressure section, said actuator being responsive to the fluid pressure in said control pressure section.

8. In a pneumatic control means, the combination comprising: body means forming a chamber with an inlet formed to receive fluid under pressure; movable wall means dividing said chamber into inlet and control pressure sections, said body means forming an orifice establishing restricted communication between said inlet and control pressure sections; valve means disposed in said body means for movement by said wall means to control fluid flow from said inlet to said inlet pressure section; resilient means in said body means tending to move said wall means in a direction to open said valve means; means forming a vent port establishing communication between the control pressure section and the ambient atmosphere; a vent valve responsive solely to a change in a condition externally of said body means to control fluid flow through said vent port to vary the pressure in said control pressure section; and a fluid pressure responsive actuator separate from said vent valve and communicating with said control pressure section, said actuator being responsive to the fluid pressure in said control pressure section.

9. In a pneumatic control means, the combination comprising: body means forming a chamber with an inlet formed to receive fluid under pressure; movable wall means dividing said chamber into inlet and control pressure sections, said body means forming an orifice establishing restricted communication between said inlet and control pressure sections; valve means disposed in said body means for movement by said wall means to control fluid flow from said inlet to said inlet pressure section; resilient means in said body means tending to move said wall means in a direction to open said valve means; means forming a vent port establishing communication between the control pressure section and the ambient atmosphere; vent valve means disposed for movement to control fluid flow through said vent port and vary the pressure in said control pressure section; pressure responsive means disposed relative to said vent valve to effect operation thereof in response to pressure changes caused by a condition externally of said body means; and a fluid pressure responsive actuator separate from said vent valve and communicating with said control pressure section, said actuator being responsive to the fluid pressure in said control pressure section.

10. In a pneumatic control means, the combination comprising: body means forming a chamber with an inlet formed to receive fluid under pressure; movable wall means dividing said chamber into inlet and control pressure sections, said body means forming an orifice establishing restricted communication between said inlet and control pressure sections; valve means disposed in said body means for movement by said wall means to control fluid flow from said inlet to said inlet pressure section; resilient means in said body means tending to move said wall means in a direction to open said valve means; means forming a vent port establishing communication between the control pressure section and the ambient atmosphere; vent valve means disposed for movement to control fluid flow through said vent port and vary the pressure in said control pressure section; resilient means tending to bias said vent valve in one direction; diaphragm means providing a differential area responsive to fluid pressure to move said vent valve in the other direction in opposition to said resilient means; and a fluid pressure responsive actuator separate from said vent valve and communicating with said control pressure section, said actuator being responsive to the fluid pressure in said control pressure section.

References Cited in the file of this patent

UNITED STATES PATENTS

| | | |
|---|---|---|
| 2,272,684 | Vickers | Feb. 10, 1942 |
| 2,668,697 | Sager | Feb. 9, 1954 |
| 2,718,232 | Cook | Sept. 20, 1955 |
| 2,767,725 | Long | Oct. 23, 1956 |
| 2,859,768 | Teague | Nov. 11, 1958 |

FOREIGN PATENTS

| | | |
|---|---|---|
| 475,178 | Canada | July 10, 1951 |
| 1,042,859 | France | June 10, 1953 |
| 899,286 | Germany | Dec. 10, 1953 |
| 729,077 | Great Britain | May 4, 1957 |